Aug. 10, 1948. W. M. SAGE 2,446,555
THERMOSTATICALLY CONTROLLED ELECTRIC HEATER
Filed Sept. 26, 1944
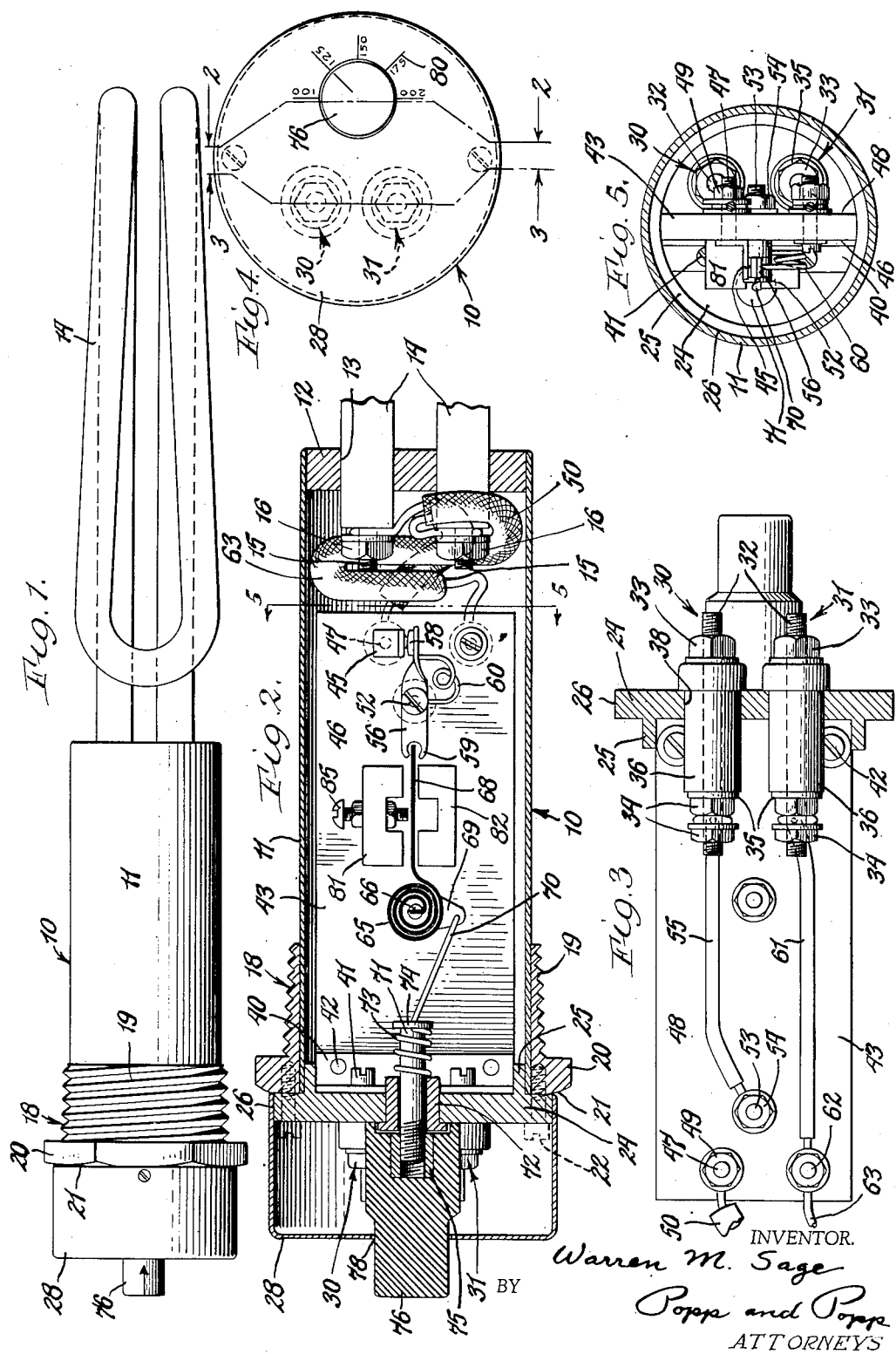
INVENTOR.
Warren M. Sage
BY Popp and Popp
ATTORNEYS Patented Aug. 10, 1948

2,446,555

UNITED STATES PATENT OFFICE 2,446,555

THERMOSTATICALLY CONTROLLED ELECTRIC HEATER

Warren M. Sage, Fort Worth, Tex., assignor, by mesne assignments, to Joseph A. Sanders and Nelle Sanders, jointly, both of Buffalo, N. Y.

Application September 26, 1944, Serial No. 555,795

6 Claims. (Cl. 219—38)

This invention relates to a thermostatically controlled electric heater and more particularly to a self-contained immersion resistance type of electric heater which is adapted to be immersed in the body of liquid to be kept at a temperature corresponding to the setting of the thermostat and which is sealed against the entrance of the liquid into the chamber containing the thermostatic element and the electrical connections between the power line and the heating element.

One of the principal objects of the invention is to provide an immersion type of electric heater which can be easily and quickly adjusted to heat the fluid in which it is immersed and maintain the temperature of such fluid within very close limits.

Another object of the invention is to provide such a heater of high heating capacity and capable of handling the amount of current necessary to provide such heat.

Another aim is to provide such an immersion heater in which the thermostat and its electrical connections with the power line and the resistance heating element are adequately protected against moisture or leakage.

Another object is to so arrange the thermostatic element and its enclosing housing or shell that the thermostatic element is principally responsive to changes in temperature of the fluid in which the heater is immersed and not to the temperature of the heating element itself.

Another aim is to provide such a heater which can be manufactured and sold at low cost and which is free from danger to the user either from shock or fire hazard.

Another purpose is to provide such an immersion heater which is reliable in operation and which will stand up under conditions of severe and constant use without getting out of order or requiring repairs.

In the accompanying drawings:

Fig. 1 is a side elevation of a thermostatically controlled resistance type of electric immersion heater embodying the present invention.

Fig. 2 is an enlarged fragmentary vertical sectional view therethrough, taken generally on line 2—2, Fig. 4.

Fig. 3 is an enlarged fragmentary vertical sectional view therethrough taken on line 3—3, Fig. 4.

Fig. 4 is an end elevation thereof.

Fig. 5 is a vertical transverse section taken on line 5—5, Fig. 2.

The heater embodying the present invention is shown as including a tubular shell which is adapted to be screwed into the wall of a tank or reservoir containing the fluid to be maintained at the desired temperature and housing the thermostat elements so that these elements are responsive to the temperature of the fluid in the tank. The connection between the power line and this shell and also the manual control for the setting of the thermostat are arranged outside of the tank and the shell is provided with an end head of electrical and thermal insulating material from which the electrical resistance element projects into the fluid contained within the tank or reservoir.

The tubular shell, indicated generally at 10, is shown as comprising a cylindrical tube or sleeve 11 made of relatively thin-walled metal and which, before assembly, is open at its ends. The inner end of this tube or sleeve is closed by a circular end head 12 which is inserted into the tube or sleeve and can be secured and sealed therein in any suitable manner. This circular end head 12 is provided with a pair of openings 13 through which the opposite ends of an electrical resistance heating element 14 extend, these ends being secured and sealed in these holes in any suitable manner. Within the shell or tube 11 each end of the resistance heating element 14 is provided with a binding post 15 carrying the usual nut 16.

To the exterior of the opposite end of the tube or sleeve 11 is secured a collar 18 this collar being externally threaded, as indicated at 19, so that the heater can be screwed into a fitting (not shown) in the side of the tank containing the fluid to be maintained at the desired temperature with the larger part of the tubular shell 10 and the heating element 14 immersed in this fluid. The outer end of the collar 18 is formed to provide an enlarged hexagonal or out-of-round head 20 for this purpose, the outer face 21 of this head 20 being preferably substantially coincident with the outer end of the tube 11.

To this outer face 21 is secured, by screws 22, or in any other suitable manner, a circular end head 24, this end head preferably having an axially extending annular flange 25 which fits into the adjacent end of the tube 11 and also having a cylindrical periphery 26 over which a cup shaped cap 28 can be fitted. At one side the head 24 is shown as carrying a pair of binding posts 30, 31, which can be of any suitable character and are shown as comprising a central metal stem 32 to the outer and inner threaded ends of which nuts 33 and 34 are applied and surrounded by a sleeve 35 of insulating material which is encased in a metal sleeve 36 which can be press fitted in a corresponding opening 38 in the head 24. The two sides (not shown) of the main power line are adapted to be connected to the outer ends of these binding posts 30 and 31.

Extending diametrically across the inner face of the head 24 is an angle bar or bracket 40 one flange of which can be secured to the head 24 in any suitable manner as by screws 41. To the outwardly projecting flange of the angle bar 40 is secured, as by a pair of screws 42, a central panel or partition 43 of dielectric material, this panel extending axially through the chamber formed by the tube 11 and its end heads and terminating short of the opposite end thereof. The opposite longitudinal edges of this partition or panel 43 are also preferably separated from the inner face of the tube 11. On this dielectric panel or partition is mounted a thermostatic switch which is preferably constructed as follows:

The numeral 45 represents a stationary contact which is preferably of L-shaped form having one leg arranged against the forward face 46 of the panel 43 and having a threaded stem 47 projecting through this panel from the opposite face 48 thereof. This stationary contact is held in place by a nut 49 on the stem 47 which also secures one end of a wire 50 in electrical contact therewith, the other end of this wire being secured to the binding post or stud 15 at one end of the resistance heating element 14. Also projecting from the forward face 48 of the panel is a pin 52 having a threaded stem 53 projecting through this panel and carrying a nut 54. This nut 54 secures the pin 52 to the panel and also connects it with one end of a wire 55, the other end of this being secured to the binding post 30.

A movable contact 56 is pivotally mounted on the pin 52, this movable contact being in the form of a double ended arm, one arm carrying the contactor 58 which engages the outwardly projecting leg of the stationary contact 45 and the other end of which is bifurcated, as indicated at 59. A spring 60 between the movable contact 56 and its supporting pin 52 yieldingly urges the movable contact 56 into engagement with the fixed contact 45 and forms part of the electrical circuit between the supporting pin 52 and the movable contact 56.

The circuit is completed by a wire 61 connecting the external binding post 31 with a binding post 62 secured at the end of the panel 43, this binding post being in turn connected by a wire 63 with the stud or binding post 15 at the other end of the resistance element 14.

A bimetallic element 65 in the form of a strip has one end fast to a shaft 66 which is rotatably mounted on the panel 43 to project outwardly from the face 46 thereof. This bimetallic strip 65 is coiled into a spiral and has its free end in the form of a straight strip 68 which is arranged between the bifurcations of the movable contact arm 56. An arm 69 is fast to the shaft 66 and this arm is connected by a link 70 to the end of an axially movable rod or pin 71. This pin is slidably mounted in a collar 72 extending through the end head 24 and this pin is urged inwardly by a surrounding helical compression spring 73 interposed between the inner end of this collar and a head 74 on the inner end of the pin.

The opposite end of the pin 71 is threaded and projects outwardly from the collar 72 and is screwed into an internally threaded sleeve 75 which is secured within a knob 76 of insulating material. This knob projects through a hole 78 provided in the cap 28 and is provided with an indexing mark traversing a series of graduations 80 provided on the cap 28, these graduations preferably being in the degrees of temperature which correspond to the setting of the thermostat in the corresponding position of the knob 76.

In order to provide a snap action in the thermostatic switch, a pair of U-shaped permanent magnets 81 and 82 are preferably mounted on the forward face of the partition 43 with their poles opposing one another and flanking the straight end part 68 of the bimetallic element 65. This bimetallic element is in part made of a material of magnetic material and hence when the thermostatic element moves toward one or the other pairs of poles of either permanent magnet it tends to form a magnetic shunt and to be drawn toward that magnet. The movement of the end 68 of the bimetallic element 65 toward the permanent magnet 81, this being in the direction for opening the switch, is limited by an adjustable stop screw 85.

In use, the heating unit as above described is screwed, by the threads 19 of the collar 18, into a fitting (not shown) in the side of the tank or reservoir containing the fluid to be heated. The greater part of the tube 11, housing the thermostatic switch, and the resistance heating element 14 is immersed in the fluid while the head 24 of the unit is arranged outside of the tank or reservoir.

With the switch contacts 45 and 56 closed, current flows from one side (not shown) of the power line through the binding post 31, wire 61, binding post 62, wire 63, resistance heating element 14, wire 50, fixed contact 45, movable contact 56, post 52, wire 55 and through the binding post 30 to the other side (not shown) of the main power line.

When the fluid has been heated to the setting of the thermostatic switch, the end 68 of the bimetallic element 65 is stressed upwardly, as viewed in Fig. 2, under the influence of the heat and when this stress exceeds the attractive force of the permanent magnet 82 this end snaps upwardly thereby snapping the movable contact 56 out of engagement with the fixed contact 45 and breaking the circuit. For this purpose one of the metals used in the bimetallic element is magnetic. When the temperature of the fluid drops the end 68 of the element 65 moves downwardly as viewed in Fig. 2 and as it approaches the poles of the permanent magnet 82 the attractive force of this permanent magnet rapidly increases and snaps the end 68 toward it thereby snapping the movable contact 56 into engagement with the fixed contact 45 and reestablishing the circuit. The balancing effect of the permanent magnet 81, which is arranged in opposition to the permanent magnet 82, is adjusted by the screw 85. Thus this screw limits the extent to which the end 68 of the bimetallic element 65 can be brought under the influence of the permanent magnet 81.

The adjustment of the thermostat is effected by turning the knob 76 so that its pointer is brought to the desired temperature graduation 80. Turning this knob turns the threaded sleeve therein and thereby moves the pin 71 axially. This draws or pushes the link 70 thereby to rotate the arm 69. Since this arm is fast to the shaft 66 which carries the inner end of the bimetallic thermostat element 65, it will be seen that this element is wound up or released so as to alter the temperature at which it will make and break the contact between the fixed contact 45 and the movable contact 56.

From the foregoing it will be seen that the present invention provides a high wattage resistance heater unit in which the thermostatic control element is incorporated in the unit and quickly responsive to changes in temperature of the fluid being heated and is at the same time adequately protected against moisture and is readily accessible. The unit is moreover simple and inexpensive in construction and is free from operating or service difficulties.

I claim as my invention:

1. A thermostatically controlled electric immersion heater, comprising a tubular shell, means at the outer end of said shell for securing it in an opening through the wall of a tank containing the fluid to be heated with the greater part of its length immersed in the fluid, an end head closing the inner end of said shell, a resistance heating element carried by said end head and projecting therefrom into said fluid, a second end head enclosing the outer end of said shell, a thermostatic switch in said shell and wholly enclosed within circuit with said resistance heating element, and means extending through said second end head for connecting said circuit with a power line.

2. A thermostatically controlled electric immersion heater, comprising a tubular shell, an externally threaded collar directly embracing and secured to the exterior of one end of said shell and adapted to secure said shell in a threaded opening through the wall of a tank containing the fluid to be heated, an end head closing the end of said shell opposite said collar, a resistance heating element carried by said end head and projecting therefrom into said fluid, a second end head, means removably securing said second head directly to said collar and closing the end of said shell adjacent said collar, a thermostatic switch in said shell and carried by said second end head and wholly enclosed within circuit with said resistance heating element, and means extending through said second end head for connecting said circuit with a power line.

3. A thermostatically controlled electric immersion heater, comprising a tubular shell, means at one end of said shell for securing it in an opening through the wall of a tank containing the fluid to be heated with the greater part of its length immersed in the fluid, an end head closing the other end of said shell, a resistance heating element carried by said end head and projecting therefrom into said fluid, a second end head enclosing said one end of said shell, a panel rigidly secured at one edge to said second end head and projecting axially into said shell, a thermostatic switch mounted on said panel and in circuit with said resistance heating element, and means extending through said second end head for connecting said circuit with a power line.

4. A thermostatically controlled electric immersion heater, comprising a tubular shell, means at one end of said shell for securing it in an opening through the wall of a tank containing the fluid to be heated, with the greater part of its length immersed in the fluid, an end head enclosing the opposite end of said shell, a resistance heating element carried by said end head, a second end head enclosing said one end of said shell, an adjustable thermostatic switch in said shell and in circuit with said resistance heating element, means extending through said second end head for connecting said circuit with a power line, an internally threaded adjusting knob arranged on the exterior of said second end head, a non-rotatable screw extending through said second end head and having a threaded end screwed into said knob to permit relative movement between said knob and screw in a direction longitudinally of said screw, a head on the opposite end of said screw and arranged within said shell, a helical compression spring around said screw and interposed between its head and said second end head of said shell, and means within said shell and actuating said thermostatic switch through motion derived from the longitudinal movement of said screw.

5. A thermostatically controlled immersion heater, comprising a tubular shell, means at one end of said shell for securing it in an opening through the wall of a tank containing the fluid to be heated with the greater part of its length immersed in said fluid, an end head enclosing the other end of said shell, a resistance heating element carried by said end head and projecting therefrom into said fluid, a second end head enclosing said one end of said shell, a panel of dielectric material rigidly secured at one edge to said second end head and projecting axially into said shell, an adjustable thermostatic switch mounted on one side of said panel and including a stationary contact, a movable contact, a shaft journaled on said panel and a spiral bimetallic element having its inner convolution secured to said shaft and having its free end arranged to actuate said movable contact, means connecting said fixed and movable contacts in circuit with said resistance heating element and in circuit with a power line, and means extending through said second end head and arranged on said one side of said panel for adjusting said thermostatic switch, comprising an arm on said shaft, an internally threaded knob arranged on the exterior of said second end head, a screw extending through said second end head and having a threaded end adjustably screwed into said knob to permit relative movement between said knob and screw in a direction longitudinally of said screw, a head on the opposite end of said screw and arranged within said shell, a helical compression spring around said screw and interposed between its head and said second end head of said shell, and a link connecting said screw and arm and moving said arm through motion derived from the longitudinal movement of said screw.

6. A thermostatically controlled immersion heater, comprising a tubular shell, means at one end of said shell for securing it in an opening through the wall of a tank containing the fluid to be heated with the greater part of its length immersed in said fluid, an end head enclosing the other end of said shell, a resistance heating element carried by said end head, a second end head enclosing said one end of said shell, a panel of dielectric material secured at one edge to said second end head and projecting axially into said shell, a thermostatic switch mounted on one side of said panel and including a stationary contact, a movable contact, a spiral bimetallic element having its inner convolution secured to said panel and having its free end arranged to actuate said movable contact, one of the metals of said bimetallic element being magnetic, and a pair of permanent magnets having opposed poles arranged adjacent and on opposite sides of the free end of said bimetallic element and in the plane of movement thereof, and means connecting said fixed and movable contacts in circuit with said resistance heating element and in circuit with a power line.

WARREN M. SAGE.

REFERENCES CITED

The following references are of record in the file of this patent:

UNITED STATES PATENTS

| Number | Name | Date |
|---|---|---|
| 1,146,637 | Massa | July 13, 1915 |
| 1,756,660 | Perry | Apr. 29, 1930 |
| 2,039,641 | Fichtner | May 5, 1936 |
| 2,163,801 | Newell | June 27, 1939 |
| 2,194,820 | Connell et al. | Mar. 26, 1940 |
| 2,201,703 | Sage | May 21, 1940 |
| 2,217,595 | Morgan et al. | Oct. 8, 1940 |
| 2,223,359 | Eisinga | Dec. 3, 1940 |